United States Patent
Phillips et al.

(10) Patent No.: US 8,425,368 B2
(45) Date of Patent: Apr. 23, 2013

(54) TRANSMISSION HAVING AT LEAST TEN SPEEDS

(75) Inventors: Andrew W. Phillips, Rochester, MI (US); Scott H. Wittkopp, Ypsilanti, MI (US); James M. Hart, Belleville, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 179 days.

(21) Appl. No.: 12/901,908

(22) Filed: Oct. 11, 2010

(65) Prior Publication Data

US 2012/0088625 A1  Apr. 12, 2012

(51) Int. Cl.
*F16H 3/62* (2006.01)

(52) U.S. Cl.
USPC .......................................... 475/275; 475/284

(58) Field of Classification Search ........................ None
See application file for complete search history.

(56) References Cited

U.S. PATENT DOCUMENTS

| | | | |
|---|---|---|---|
| 6,991,578 B2 | 1/2006 | Ziemer | |
| 7,011,597 B2 | 3/2006 | Haka | |
| 7,018,319 B2 | 3/2006 | Ziemer | |
| 2009/0011891 A1* | 1/2009 | Phillips et al. | 475/275 |
| 2009/0017977 A1* | 1/2009 | Phillips et al. | 475/276 |
| 2009/0215580 A1* | 8/2009 | Hart et al. | 475/276 |

* cited by examiner

*Primary Examiner* — David D Le
*Assistant Examiner* — Erin D Bishop

(57) ABSTRACT

A transmission of the present invention has an input member, an output member, two planetary gear sets, a planetary gear set assembly, a plurality of coupling members and a plurality of torque transmitting devices. Each of the planetary gear sets includes first, second and third members. The planetary gear set assembly includes first, second, third and fourth members. The torque transmitting devices may include clutches and brakes. The torque transmitting devices are selectively engageable in combinations of at least three to establish at least ten forward speed ratios and at least one reverse speed ratio.

14 Claims, 2 Drawing Sheets

| GEAR STATE | GEAR RATIO | RATIO STEP | CLUTCHING ELEMENTS | | | | | |
|---|---|---|---|---|---|---|---|---|
| | | | 32 | 34 | 24 | 30 | 26 | 28 |
| Rev | -3.575 | | | X | X | X | | |
| N | | -0.94 | | | | | | |
| 1st | 3.802 | | X | X | X | | | |
| 2nd | 2.485 | 1.53 | X | X | | | X | |
| 3rd | 1.842 | 1.35 | X | X | | | | X |
| 4th | 1.433 | 1.29 | | X | | | X | X |
| 5th | 1.177 | 1.22 | X | | | | X | X |
| 6th | 1.000 | 1.18 | | | X | | X | X |
| 7th | 0.867 | 1.15 | X | | X | | | X |
| 8th | 0.717 | 1.21 | X | | | X | | X |
| 9th | 0.664 | 1.08 | X | | X | X | | |
| 10th | 0.608 | 1.09 | X | | | X | X | |

X = ON - ENGAGED CARRYING TORQUE

FIG. 3

TRANSMISSION HAVING AT LEAST TEN SPEEDS

FIELD

The present invention relates generally to a multiple speed transmission having a plurality of planetary gear sets and a plurality of torque transmitting devices, and more particularly to a transmission having ten or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches and brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, two planetary gear sets, a planetary gear set assembly, a plurality of coupling members and a plurality of torque transmitting devices. Each of the two planetary gear sets includes a first, a second and a third member. The planetary gear set assembly includes a first, a second, a third and a fourth member. The torque transmitting devices are for example clutches and brakes.

In an aspect of the present invention, a first planetary gear set has a sun gear, a carrier member and a ring gear.

In another aspect of the present invention, a second planetary gear set has a sun gear, a carrier member and a ring gear and the output member is continuously interconnected with the ring gear member of the second planetary gear set.

In yet another aspect of the present invention, a planetary gear set assembly has a first sun gear, a second sun gear, a carrier member and a ring gear and the input member is continuously interconnected with the carrier member of the planetary gear set assembly.

In yet another aspect of the present invention, a first interconnecting member continuously interconnects the ring gear of the planetary gear set assembly with the sun gear of the first planetary gear set.

In yet another aspect of the present invention, a second interconnecting member continuously interconnects the ring gear of the first planetary gear set with the carrier member of the second planetary gear set.

In yet another aspect of the present invention, a first torque transmitting device is selectively engageable to interconnect the carrier member of the planetary gear set assembly and the input member with the sun gear of the second planetary gear set.

In yet another aspect of the present invention, a second torque transmitting device is selectively engageable to interconnect the second sun gear of the planetary gear set assembly with the sun gear of the second planetary gear set.

In yet another aspect of the present invention, a third torque transmitting device is selectively engageable to interconnect the carrier member of the first planetary gear set with the sun gear of the second planetary gear set.

In still another aspect of the present invention, a fourth torque transmitting device is selectively engageable to interconnect the carrier member of the first planetary gear set with the sun gear of the first planetary gear set and the ring gear of the planetary gear set assembly.

In still another aspect of the present invention, a fifth torque transmitting device is selectively engageable to interconnect the first sun gear of the planetary gear set assembly with the stationary member.

In still another aspect of the present invention, a sixth torque transmitting device is selectively engageable to interconnect the carrier member of the first planetary gear set with the stationary member, and wherein the torque transmitting devices are each selectively engageable in combinations of at least three to establish at least ten forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that in the particular example provided, the ten speed automatic transmission of the present invention has an arrangement of permanent mechanical connections between the components or elements of the four planetary gear sets. A third component or element of the first planetary gear set is permanently coupled to a third component or element of a second planetary gear set. A second component or element of the first planetary gear set and the input member are permanently coupled to a second component or element of a second planetary gear set. A third component or element of a second planetary gear set is permanently coupled to a first component or element of a third planetary gear set. A third component or element of a third planetary gear set is permanently coupled to a second component or element of a fourth planetary gear set.

Figure 1:
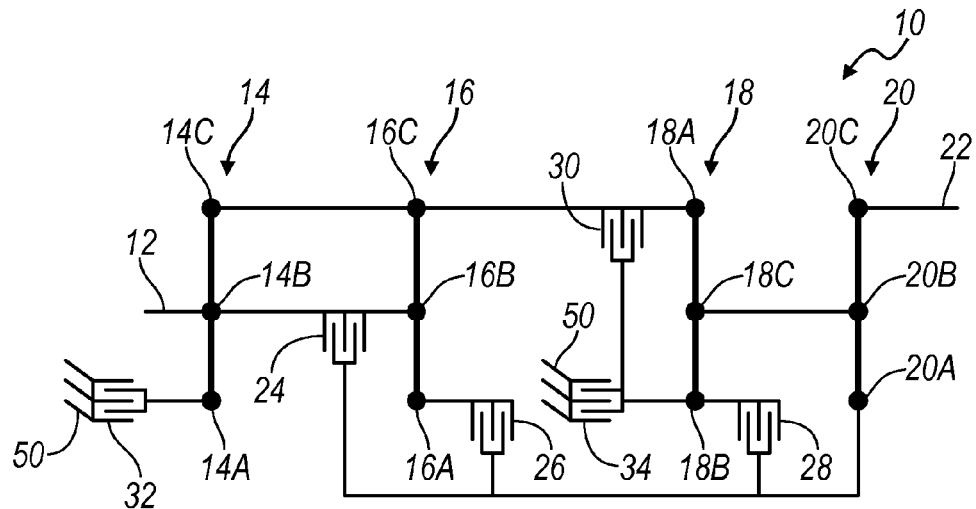
FIG. 1 is a lever diagram of an embodiment of a ten speed transmission according to the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20 and an output shaft or member 22. In the lever diagram of FIG. 1, the first planetary gear set 14 has three nodes each: a first node 14A, a second node 14B and a third node 14C. The second planetary gear set 16 has three nodes each: a first node 16A, a second node 16B and a third node 16C. The third planetary gear set 18 has three nodes each: a first node 18A, a second node 18B and a third node 18C. The fourth planetary gear set 20 has three nodes each: a first node 20A, a second node 20B and a third node 20C.

The first node 14A of the first planetary gear set 14 is coupled to a stationary member or a transmission housing 50. The input member 12 is coupled to the second node 14B of the first planetary gear set 20. The second node 14B of the first planetary gear set 14 is coupled to the second node 16B of the second planetary gear set 16. The third node 14C of the first planetary gear set 14 is coupled to the third node 16C of the second planetary gear set 16. The third node 16C of the second planetary gear set 16 is coupled to the first node 18A of the third planetary gear set 18. The third node 18C of the third planetary gear set 18 is coupled to the second node 20B of the fourth planetary gear set 20. The output member 22 is coupled to the third node 20C of the fourth planetary gear set 20.

A first clutch 24 selectively connects the first node 14B of the first planetary gear set 14, the second node 16B of the second planetary gear set 16 and the input member 12 with the first node 20A of the fourth planetary gear set 20. A second clutch 26 selectively connects the first node 16A of the second planetary gear set 16 with the first node 20A of the fourth planetary gear set 20. A third clutch 28 selectively connects the second node 18B of the third planetary gear set 18 with the first node 20A of the fourth planetary gear set 20. A fourth clutch 30 selectively connects the third node 14C of the first planetary gear set 14, the third node 16C of the second planetary gear set 16 and the first node 18A of the third planetary gear set 18 with the second node 18B of the third planetary gear set 18. A first brake 32 selectively connects the first node 14A of the first planetary gear set 14 with a stationary element or a transmission housing 50. A second brake 34 selectively connects the second node 18B of the third planetary gear set 18 with the stationary element or a transmission housing 50.

Figure 2:
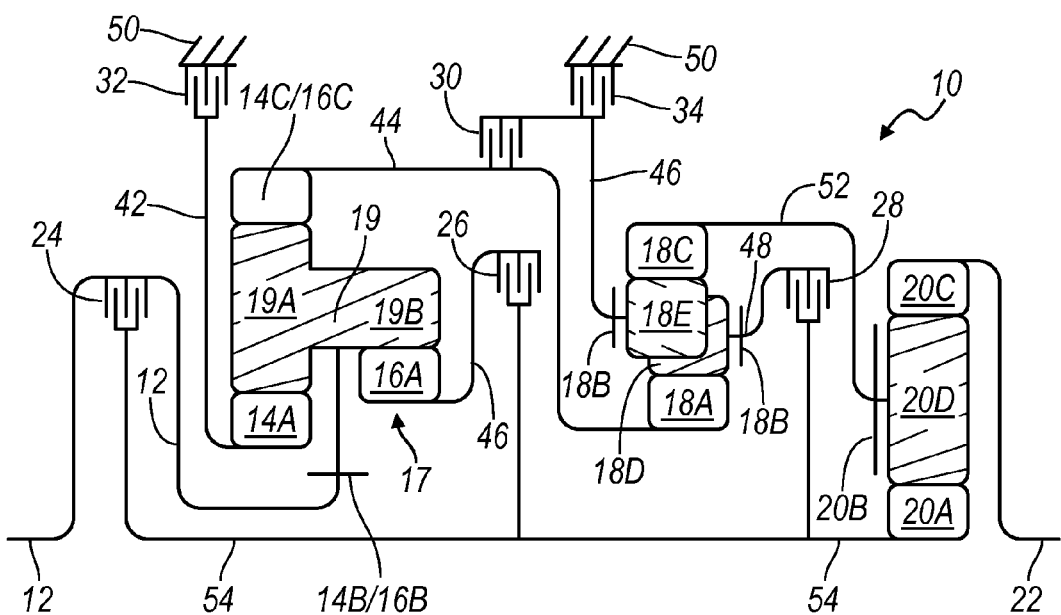
FIG. 2 is a diagrammatic view of an embodiment of a ten speed transmission according to the present invention.

Referring now to FIG. 2, a stick diagram presents a schematic layout of the embodiment of the ten speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

In an embodiment of the present invention, planetary gear sets 14 and 16 (shown in the lever diagram of FIG. 1) are combined to form a planetary gear set assembly 17. Planetary gear set assembly 17 includes a sun gear member 14A, a ring gear member 14C/16C and a planet gear carrier member 14B/16C that rotatably supports a set of planet gears 19 (only one of which is shown). The planet gears 19 are long pinion gears that have a first end 19a that is larger than a second end 19b. The planet gears 19 are each configured to intermesh with both the sun gear member 14A and the ring gear member 14C/16C at the first end 19a and intermesh with the sun gear member 16A at the second end 19b. The sun gear member 14A is connected for common rotation with a first shaft or interconnecting member 42. The ring gear member 14C/16C is connected for common rotation with a second shaft or interconnecting member 44. The planet carrier member 14B/16C is connected for common rotation with the input shaft or member 12.

The planetary gear set 18 includes a sun gear member 18A, a ring gear member 18C and a planet gear carrier member 18B that rotatably supports a first set of planet gears 18D (only one of which is shown) and a second set of planet gears 18E (only one of which is shown). The planet gears 18D are each configured to intermesh with both the sun gear member 18A and second set of planet gears 18E. The planet gears 18E are each configured to intermesh with both the ring gear member 18C and first set of planet gears 18D. The sun gear member 18A is connected for common rotation with a second shaft or interconnecting member 44. The planet carrier member 18B is connected for common rotation with a third shaft or interconnecting member 46 and a fourth shaft or interconnecting member 48. The ring gear member 18C is connected for common rotation with a fifth shaft or interconnecting member 52.

The planetary gear set 20 includes a sun gear member 20A, a ring gear member 20C and a planet gear carrier member 20B that rotatably supports a set of planet gears 20D (only one of which is shown). The planet gears 20D are each configured to intermesh with both the sun gear member 20A and the ring gear member 20C. The sun gear member 20A is connected for common rotation with a sixth shaft or interconnecting member 54. The ring gear member 20C is connected for common rotation with the output shaft member 22. The planet carrier member 20B is connected for common rotation with the fifth shaft or interconnecting member 52.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or first clutch 24, second clutch 26, third 28, fourth 30 and brakes 32 and 34 allow for selective interconnection of the shafts or interconnecting members, members of the planetary gear sets and the housing. For example, the first clutch 24 is selectively engageable to connect the input shaft member 12 with the sixth shaft or interconnecting member 54. The second clutch 26 is selectively engageable to connect the third shaft or interconnecting member 46 with the sixth shaft or interconnecting member 54. The third clutch 28 is selectively engageable to connect the fourth shaft or interconnecting member 48 with the sixth shaft or interconnecting member 54. The fourth clutch 30 is selectively engageable to connect the second shaft or interconnecting member 44 with the third shaft or interconnecting member 46. The first brake 32 is selectively engageable to connect the first shaft or interconnecting member 42 with the stationary element or the transmission housing 50 in order to prevent the member 42 from rotating relative to the transmission housing 50. The second brake 34 is selectively engageable to connect the third shaft or interconnecting member 46 with the stationary element or the transmission housing 50 in order to prevent member 46 from rotating relative to the transmission housing 50.

Referring now to FIGS. 2 and 3, the operation of the embodiment of the ten speed transmission 10 will be described. It will be appreciated that the transmission 10 is capable of transmitting torque from the input shaft or member 12 to the output shaft or member 22 in at least ten forward speed or torque ratios and at least one reverse speed or torque ratio with quadruple overdrive. Each forward and reverse speed or torque ratio is attained by engagement of one or more of the torque-transmitting mechanisms (i.e. first clutch 24, second clutch 26, third clutch 28, fourth clutch 30, first brake 32 and second brake 34), as will be explained below. FIG. 3 is a truth table presenting the various combinations of torque-transmitting elements that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first clutch 24, the fourth clutch 30 and the second brake 34 are engaged or activated. The first clutch 24 selectively interconnects the input shaft member 12 with the sixth shaft or interconnecting member 54. The first brake 32 connects the first shaft or interconnecting member 42 with the stationary element or the transmission housing 50 in order to prevent the member 42 from rotating relative to the transmission housing 50. The second brake 34 connects the third shaft or interconnecting member 46 with the stationary element or the transmission housing 50 in order to prevent member 46 from rotating relative to the transmission housing 50. Likewise, the ten forward ratios are achieved through different combinations of clutch and brake engagement, as shown in FIG. 3.

It will be appreciated that the foregoing explanation of operation and gear states of the ten speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   a first planetary gear set having a first, a second and a third member;
   a second planetary gear set having a first, a second and a third member, wherein the output member is directly connected for common rotation with the third member of the second planetary gear set;
   a planetary gear set assembly having a first member, a second member, a third member and a fourth member;
   a first interconnecting member continuously interconnecting the third member of the planetary gear set assembly with the first member of the first planetary gear set;
   a second interconnecting member continuously interconnecting the third member of the first planetary gear set with the second member of the second planetary gear set; and
   at least six torque transmitting mechanisms each selectively engageable to interconnect at least one of the first, second, third and fourth members of the planetary gear set assembly or at least one of the first, second and third members of the first and second planetary gear sets with at least one of another of the first, second, third and fourth members of the planetary gear set assembly, another of the first, second and third members of the first and second planetary gear sets, or a stationary member, and
   wherein the at least six torque transmitting mechanisms are each selectively engageable in combinations of at least three to establish at least ten forward speed ratios and at least one reverse speed ratio between the input member and the output member, a first of the six torque transmitting devices is selectively engageable to interconnect the fourth member of the planetary gear set assembly and the input member directly to the first member of the second planetary gear set, and a second of the six torque transmitting devices is selectively engageable to interconnect the second member of the planetary gear set assembly directly to the first member of the second planetary gear set.

2. The transmission of claim 1 wherein a third of the six torque transmitting devices is selectively engageable to interconnect the second member of the first planetary gear set with the first member of the second planetary gear set.

3. The transmission of claim 2 wherein a fourth of the six torque transmitting devices is selectively engageable to interconnect the second member of the first planetary gear set with the first member of the first planetary gear set and the third member of the planetary gear set assembly.

4. The transmission of claim 3 wherein a fifth of the six torque transmitting devices is selectively engageable to interconnect the first member of the planetary gear set assembly with the stationary member.

5. The transmission of claim 4 wherein a sixth of the six torque transmitting devices is selectively engageable to interconnect the second member of the first planetary gear set with the stationary member.

6. The transmission of claim 1 wherein the first members of the first and second planetary gear sets and the first and second members of the planetary gear set assembly are sun gears, the second members of the first and second planetary gear sets and the fourth member of the planetary gear set assembly are carrier members, and the third members of the first and second planetary gear sets and the third member of the planetary gear set assembly are ring gears.

7. The transmission of claim 1 wherein the input member is continuously interconnected with the fourth member of the planetary gear set assembly.

8. The transmission of claim 1 wherein four of the six torque transmitting devices are clutches and two of the six torque transmitting devices are brakes.

9. The transmission of claim 1 wherein the stationary member is a transmission housing.

10. A transmission comprising:
an input member;
an output member;
a first planetary gear set having a first, a second and a third member;
a second planetary gear set having a first, a second and a third member, wherein the output member is directly connected for common rotation with the third member of the second planetary gear set;
a planetary gear set assembly having a first member, a second member, a third member and a fourth member, wherein the input member is continuously interconnected with the fourth member of the planetary gear set assembly;
a first interconnecting member continuously interconnecting the third member of the planetary gear set assembly with the first member of the first planetary gear set;
a second interconnecting member continuously interconnecting the third member of the first planetary gear set with the second member of the second planetary gear set;
a first torque transmitting device selectively engageable to interconnect the fourth member of the planetary gear set assembly and the input member with the first member of the second planetary gear set;
a second torque transmitting device selectively engageable to interconnect the second member of the planetary gear set assembly with the first member of the second planetary gear set;
a third torque transmitting device selectively engageable to interconnect the second member of the first planetary gear set with the first member of the second planetary gear set;
a fourth torque transmitting device selectively engageable to interconnect the second member of the first planetary gear set with the first member of the first planetary gear set and the third member of the planetary gear set assembly;
a fifth torque transmitting device selectively engageable to interconnect the first member of the planetary gear set assembly with the stationary member; and
a sixth torque transmitting device selectively engageable to interconnect the second member of the first planetary gear set with the stationary member, and wherein the torque transmitting devices are each selectively engageable in combinations of at least three to establish at least ten forward speed ratios and at least one reverse speed ratio between the input member and the output member.

11. The transmission of claim 10 wherein the first members of the first and second planetary gear sets and the first and second members of the planetary gear set assembly are sun gears, the second members of the first and second planetary gear sets and the fourth member of the planetary gear set assembly are carrier members, and the third members of the first and second planetary gear sets and the third member of the planetary gear set assembly are ring gears.

12. The transmission of claim 10 wherein the stationary member is a transmission housing.

13. A transmission comprising:
an input member;
an output member;
a first planetary gear set having a sun gear, a carrier member and a ring gear;
a second planetary gear set having a sun gear, a carrier member and a ring gear, wherein the output member is continuously interconnected with the ring gear member of the second planetary gear set;
a planetary gear set assembly having a first sun gear, a second sun gear, a carrier member and a ring gear, wherein the input member is continuously interconnected with the carrier member of the planetary gear set assembly;
a first interconnecting member continuously interconnecting the ring gear of the planetary gear set assembly with the sun gear of the first planetary gear set;
a second interconnecting member continuously interconnecting the ring gear of the first planetary gear set with the carrier member of the second planetary gear set;
a first torque transmitting device selectively engageable to interconnect the carrier member of the planetary gear set assembly and the input member with the sun gear of the second planetary gear set;
a second torque transmitting device selectively engageable to interconnect the second sun gear of the planetary gear set assembly with the sun gear of the second planetary gear set;
a third torque transmitting device selectively engageable to interconnect the carrier member of the first planetary gear set with the sun gear of the second planetary gear set;
a fourth torque transmitting device selectively engageable to interconnect the carrier member of the first planetary gear set with the sun gear of the first planetary gear set and the ring gear of the planetary gear set assembly;
a fifth torque transmitting device selectively engageable to interconnect the first sun gear of the planetary gear set assembly with the stationary member; and
a sixth torque transmitting device selectively engageable to interconnect the carrier member of the first planetary gear set with the stationary member, and wherein the torque transmitting devices are each selectively engageable in combinations of at least three to establish at least ten forward speed ratios and at least one reverse speed ratio between the input member and the output member.

14. The transmission of claim 13 wherein the stationary member is a transmission housing.

* * * * *